Figure 18:
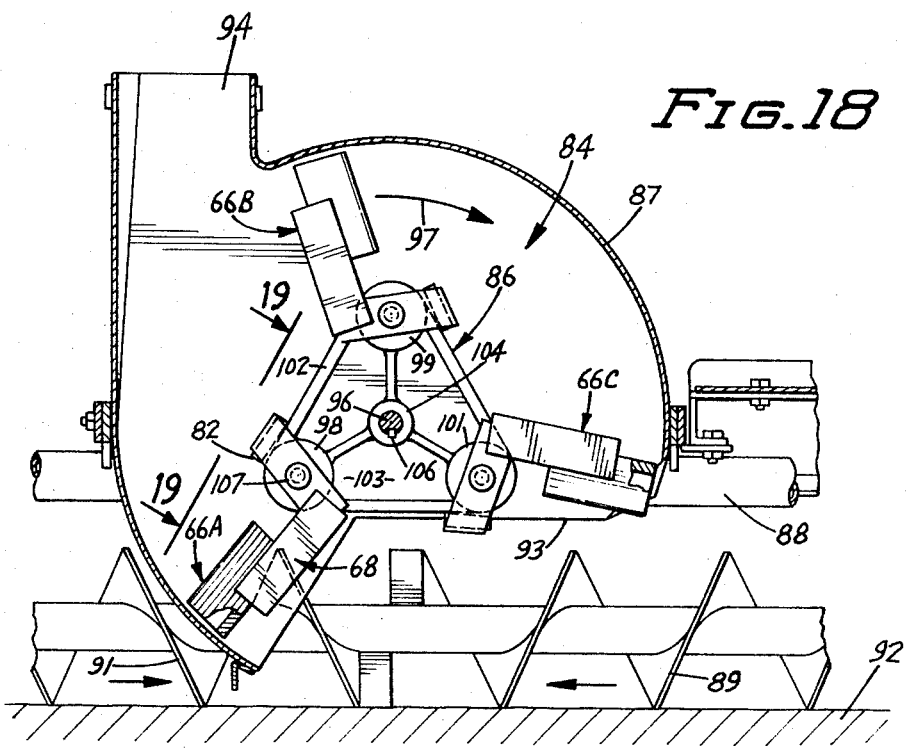

United States Patent

[11] 3,589,500

| [72] | Inventor | Glen D. Hansen |
| | | Maple Plain, Minn. |
| [21] | Appl. No. | 811,830 |
| [22] | Filed | Apr. 1, 1969 |
| [45] | Patented | June 29, 1971 |
| [73] | Assignee | Van Dale Corporation |
| | | Long Lake, Minn. |

[54] IMPELLER
21 Claims, 20 Drawing Figs.

[52] U.S. Cl. .................................................. 198/128
[51] Int. Cl. ........................................... B65g 31/00
[50] Field of Search .......................................... 198/128;
241/194, 195, 189; 239/668; 302/37; 170/141

[56] References Cited
UNITED STATES PATENTS

| 2,944,308 | 6/1960 | Beech | 198/128 |
| 2,958,412 | 11/1960 | Buschbom | 198/128 |
| 3,030,993 | 4/1962 | Schmook | 241/194 |
| 3,221,904 | 12/1965 | Buschbom | 198/128 |

Primary Examiner—Richard E. Aegerter
Attorney—Burd, Braddock and Bartz

ABSTRACT: An impeller for moving particulate material having a power driven rotor pivotally carrying a plurality of impeller paddles. Each paddle has a paddle portion and an arm pivotally connected to the rotor at a location substantially forward of a longitudinal line through the center of gravity of the paddle portion. A stop on the rotor coacts with the arm to limit forward pivotal movement of the paddle. In one embodiment of the paddle an adjustable member on the arm is engageable with the stop to adjust the forwardmost position of the paddle.

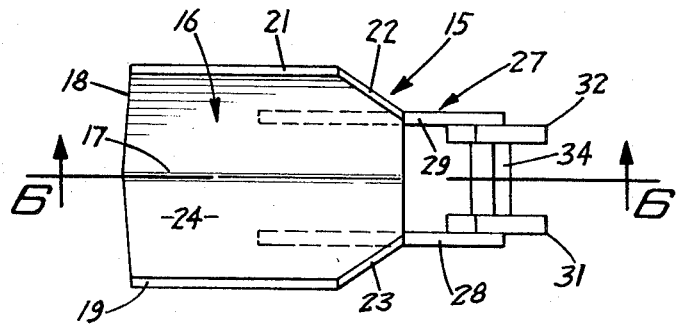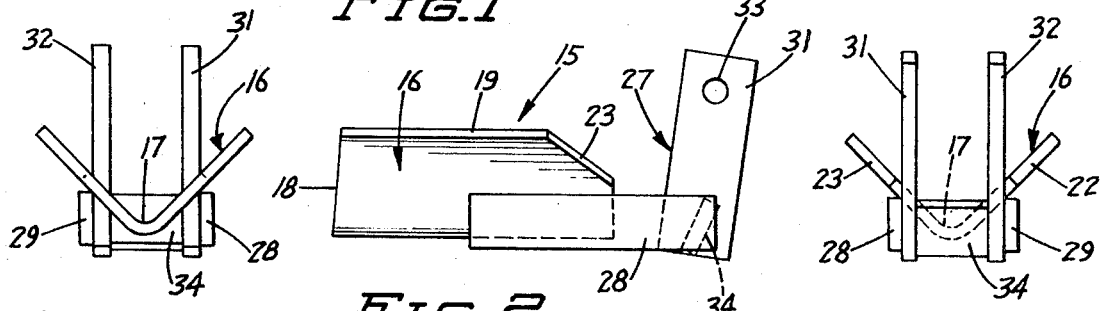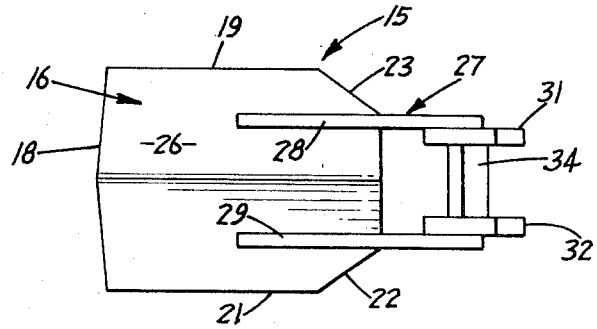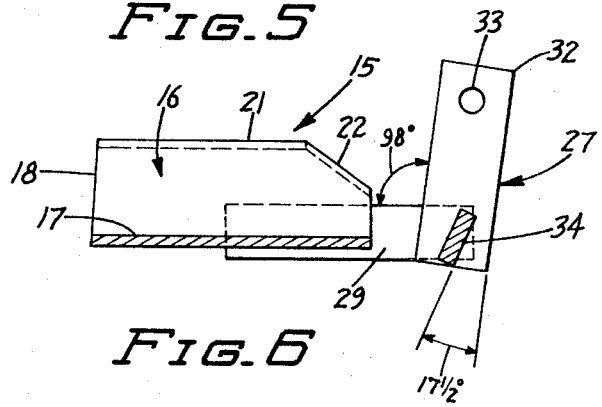

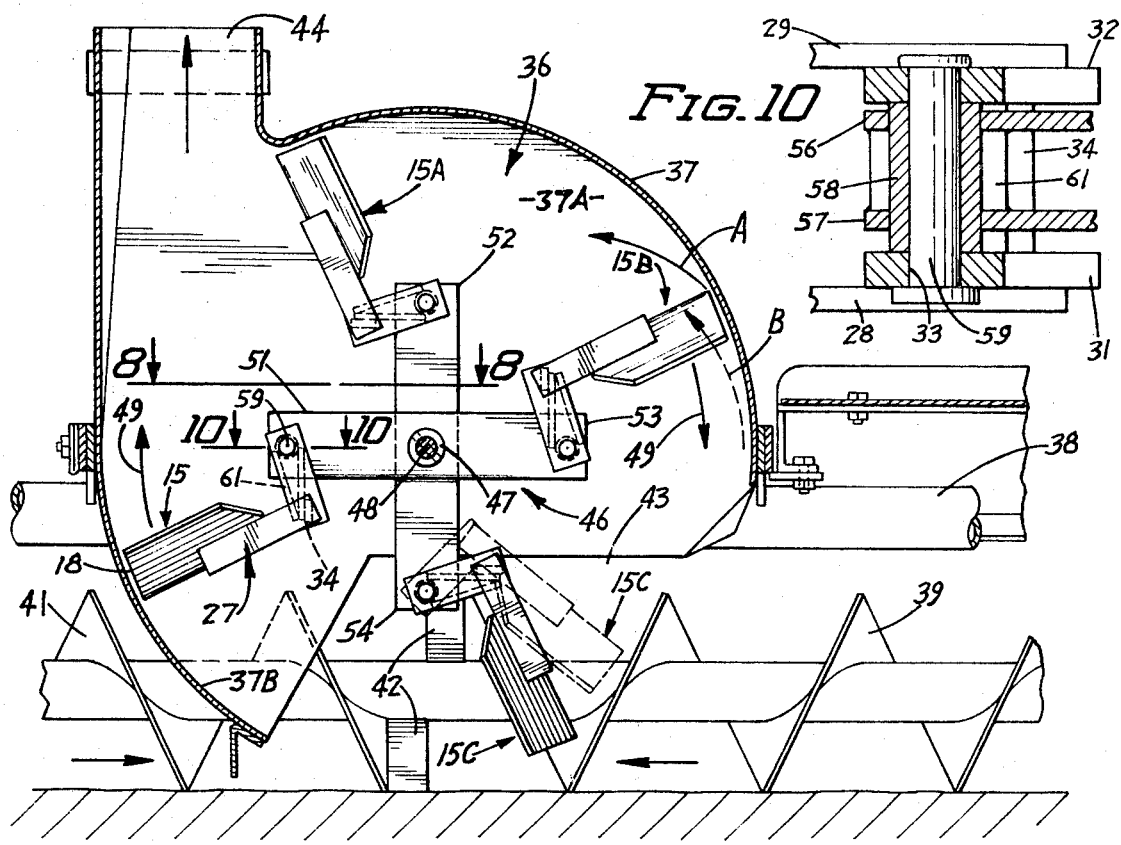
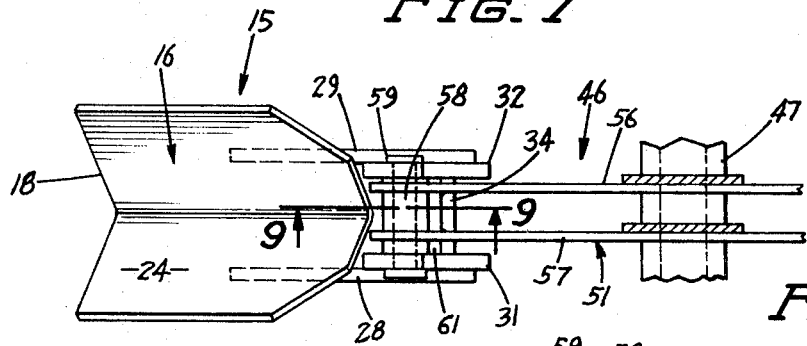
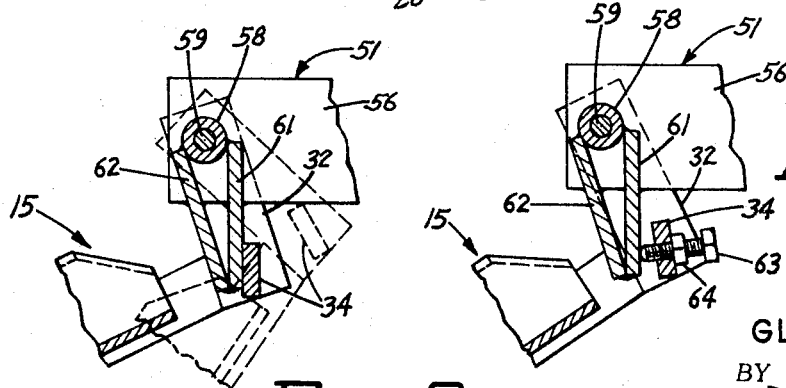

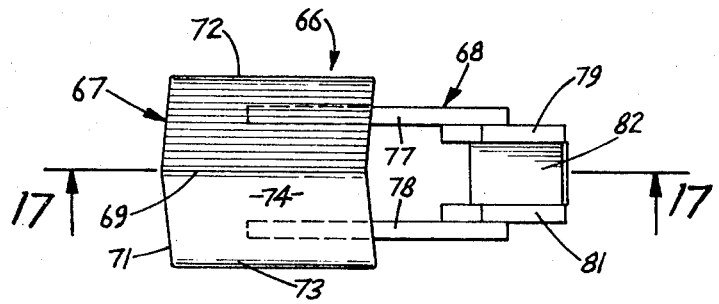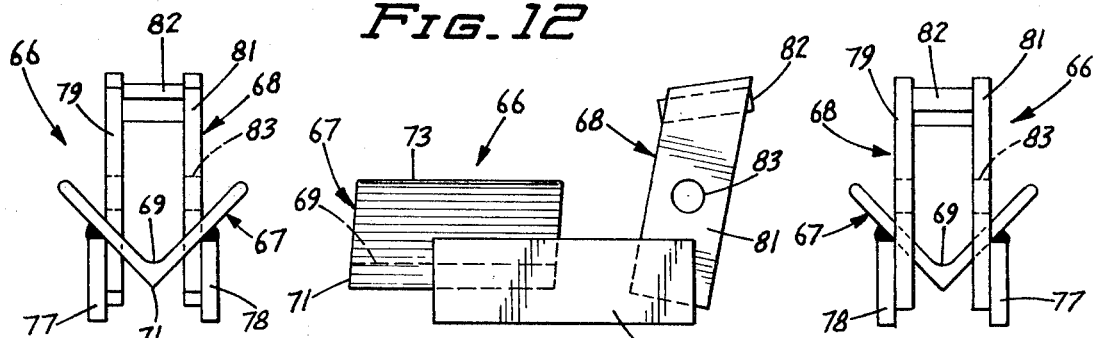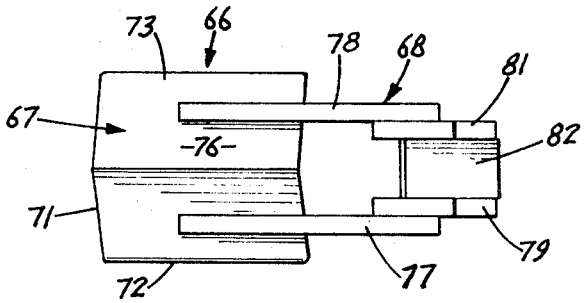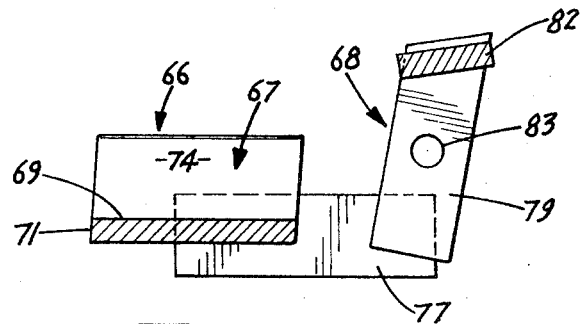

INVENTOR.
GLEN DALE HANSEN
BY Burd, Braddock & Bartz
ATTORNEYS

IMPELLER

BACKGROUND OF THE INVENTION

Material conveying impellers are used in a number of machines, as silo unloaders, material blowers, crop cutting machines, scattering unloaders, beet toppers, to pick up and convey particulate material to a new location. The throwing distance or amount of movement imported to the material is related to the effectiveness of the conveying impellers. In U.S. Pats. Nos. 2,794,560 and No. 2,958,412, there are shown silo unloaders having a rotary impeller pivotally carrying a plurality of impeller paddles for throwing ensilage into the silage chute. In large diameter silos, silo unloader discharge chutes have been equipped with booster impellers to supply additional momentum to the ensilage to eject it from the silo. A booster impeller in a discharge chute is disclosed in U.S. Pat. No. 2,877,907. The impeller of the present invention is usable to eject ensilage from a large diameter silo without the use of a booster impeller and with a general decrease in the horse power requirements of the silo unloader.

SUMMARY OF THE INVENTION

The invention relates to an impeller for conveying particulate material. The impeller includes a rotor combined with pivotally mounted paddles. Each paddle includes a paddle portion secured to arm means. The arm means are pivotally connected to the rotor at a location substantially forward of a longitudinal line through the center of gravity of the paddle portion. The arm means cooperates with a stop on the rotor to determine the foremost position of the paddle. This is the position which is normally occupied by the paddle during rotation of the rotor.

It is an object of the invention to provide a particulate material conveying impeller operable to efficiently move particulate material a substantial distance with minimum power. A further object of the invention is to include a material conveyor structure which can accommodate uneven amounts or bunches of particulate material without reducing the speed and effectiveness of the conveyor. Another object of the invention is to provide a material moving conveyor which is rugged in construction, economical in cost and capable of handling a variety of particulate materials, including but not limited to silage, haylage, snow, manure, fertilizers, grains, ground feeds, cement, sand and like discrete or particulate materials.

In The Drawings

Figure 19:
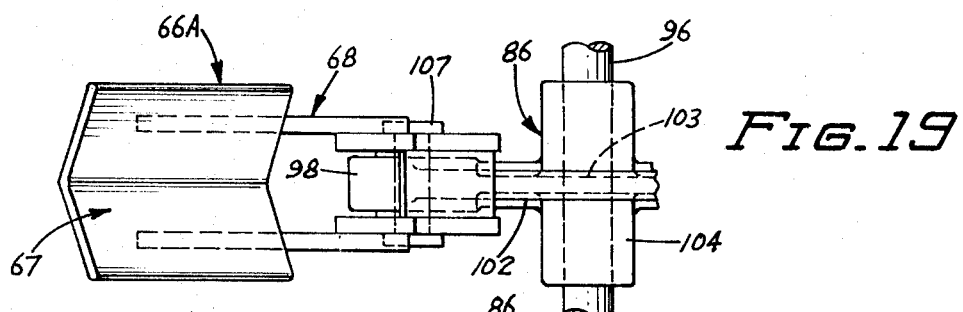
Figure 20:
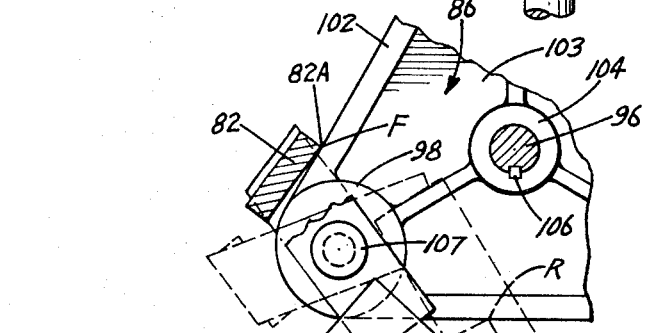

FIG. 1 is a plan view of the forward face of the paddle;
FIG. 2 is a side view of the paddle of FIG. 1;
FIG. 3 is an outer end view of the paddle;
FIG. 4 is an inner end view of the paddle;
FIG. 5 is a plan view of the back side of the paddle;
FIG. 6 is a sectional view taken along the line 6–6 of FIG. 1;
FIG. 7 is a fragmentary sectional view of a silo unloader impeller housing showing an impeller having paddles shown in FIGS. 1 to 6;
FIG. 8 is an enlarged sectional view taken along the line 8–8 of FIG. 7;
FIG. 9 is an enlarged sectional view taken along the line 9–9 of FIG. 8;
FIG. 10 is an enlarged sectional view taken along the line 10–10 of FIG. 7;
FIG. 11 is a view similar to FIG. 9 showing a modification of the arm mounting the impeller paddle on the rotor.
FIG. 12 is a plan view of the forward face of another paddle;
FIG. 13 is a side view of the paddle of FIG. 12;
FIG. 14 is an outer end view of the paddle;
FIG. 15 is an inner end view of the paddle;
FIG. 16 is a plan view of the back side of the paddle;
FIG. 17 is a sectional view taken along the line 17–17 of FIG. 12;
FIG. 18 is a fragmentary sectional view of a silo unloader impeller housing surrounding an impeller having the paddles of FIGS. 12 to 17;
FIG. 19 is a sectional view taken along the line 19–19 of FIG. 18; and
FIG. 20 is a fragmentary side view partly in section of the impeller of FIG. 18 showing a paddle pivotally mounted on a rotor.

Referring to the drawing, there is shown in FIGS. 1 and 6 a pivoted paddle indicated generally at 15 having a throwing body or portion 16 mounted on inwardly directed arm means 27. The body 16 is a generally V-shaped member having a central longitudinal valley 17. The planes of the forward of leading face 24 of the paddle are disposed approximately 90° relative to each other and intersect at a longitudinal central valley 17. The outer end 18 of body 16 extends in a forward direction at a slight inwardly directed angle so the end 18 can be located close to the wall of the impeller housing. The longitudinal sides 19 and 21 of body 16 are straight. The inside corners 22 and 23 are beveled. The body has a V-channeled leading face 24 and a complementary back or trailing face 26. The body can be formed from a flat blank and bent into a V-shape or can be cut from an angle iron. The body 16 may be other shapes, as arcuate, semicircular or flat.

Arm 27 comprises a pair of parallel first members 28 and 29 secured to the trailing face 26 on opposite sides of the center line of a body by welds or the like. The first members extend inwardly beyond the inner edge of the body 16. Secured to the inner ends of the first members are forwardly directed second members 31 and 32. As shown in FIG. 6, the second members 31 and 32 are angularly located more than 90° with respect to the first members 28 and 29. Preferably, the angle between the first members and the second members is 98°.

The outer forward ends of second members 31 and 32 have transversely aligned holes 33 for accommodating a pivot member as a pin or the like. The holes 33 are located in a plane which is forwardly of the body 16 so that the pivot axis of the paddle is forwardly of the center of gravity of the paddle. In other words, the transverse pivot axis of the paddle is located substantially forward of a longitudinal line through the center of gravity of the body 16.

Located transversely between the inner ends of the members 28 and 29 is a flat plate or cross bar 34. As shown in FIG. 6, the cross bar is angularly disposed in the inward direction with respect to the longitudinal axis of the second members 31 and 32 at an angle of about 17½°. A longitudinal line along valley 17 intersects the midsection of the flat outer side of bar 34.

Referring to FIG. 7, there is shown an impeller indicated generally at 36 located within a housing 37 substantially in the form of a scroll enclosing the impeller. The housing has two generally parallel planar sidewalls 37A attached to a curved circumferential end member 37B. The impeller and housing is part of a silo unloader having a frame 38 and silage collecting augers 39 and 41. Secured to the adjacent ends of the augers 39 and 41 are radial flipper blades 42 which are in general axial vertical alignment with the axis of rotation of the impeller 36. Rotation of the augers 39 and 41 and flippers 42 move ensilage through a bottom opening 43 in the housing into the path of the movement of the impeller. The bottom opening 43 is a combined side entrance opening and a forward circumferential entrance opening. The impeller 36 picks up and moves the ensilage through the housing and discharges the ensilage through a top tangential opening 44. An eject chute (not shown) directs the ensilage from the housing toward the silo chute.

Impeller 36 has a central rotor indicated generally at 46 comprising a hub 47 fixed to a power driven shaft 48. The rotor moves in the direction of the arrow 49. Rotor 46 has four circumferentially spaced outwardly directed legs 51, 52, 53, and 54 pivotally carrying the impeller paddles 15, 15A, 15B, and 15C. All the rotor legs as well as all the paddles 15 to 15C are identical in construction. The following description is limited to paddle 15 pivotally mounted on leg 51.

As shown in FIG. 8, leg 51 comprises a pair of parallel flat plates 56 and 57 secured to the hub 47. The outer ends of the plates 56 and 57 carries a transverse sleeve 58 which projects through actually aligned holes in the plates. The opposite ends of the sleeve project a short distance outwardly from the outsides of the plates 56 and 57 to space the paddle arm members 31 and 32 from the plates. As shown in FIG. 10, a transverse pivot pin 59 extends through the holes 33 in the paddle arm members 31 and 32 through the sleeve 58 to pivotally mount the paddle on the leg 51.

A rearwardly directed stop 61 secured to the plates 56 and 57 projects rearwardly from adjacent the inside of the sleeve 58. A brace 62 positioned along the outside of the stop 61 is secured to the sleeve 58 and the outer end of stop 61. The stop 61 extends rearwardly in a tangential direction. In other words, the stop 61 is located in a 90° relationship relative to the leg 51. The crossbar 34 located inwardly of the stop 61 moves toward and away from the stop to limit the pivotal movement of the paddle. As shown in full lines in FIG. 9, the flat outer face of bar 34 engages the outer end of stop 61 when the paddle 15 is in its forwardmost position which is the normal operating position. The outer 18 of the paddle body 16 is held in a close or contiguous relationship with the outside wall of the impeller housing 37. When the paddle is in the foremost position, the line of intersection between the two planes of the paddle along the valley 17 extends substantially through the center of rotation of the impeller or the shaft 48. The crossbar 34 also cooperates with the impeller leg 51, shown in FIG. 9 in broken lines, to determine the backmost pivoted position of the paddle. This is likely to occur when a bunch or large ball of material, as silage or haylage, is fed into the bottom opening of the impeller housing by the augers 39 and 41.

Referring to FIG. 11, there is shown the paddle 15 having an adjusting bolt 63 carrying a lock nut 64 threaded through the crossbar 34. The foremost position of the paddle can be adjusted by changing the position of the adjusting bolt 63. In this manner, the location of the outer edge 18 of the paddle body 16, relative to the adjacent housing wall, can be changed to provide a minimum of clearance between the wall and the end of the paddle body. In the normal running position of the impeller, the centrifugal force acting on the moving paddle will hold the crossbar 34 in engagement with the stop 61. The centrifugal force in addition to having a radially outwardly directed component has a circumferentially forward force component which holds the crossbar 34 in engagement with the stop 61. This forward force component is the result of locating the transverse pivot axis of the paddle forwardly of the center of gravity of the paddle.

Referring to FIGS. 12 to 17 of the drawing, there is shown another form of the pivot paddle indicated generally at 66 having a throwing body 67 mounted on inwardly directed angular arm means indicated generally at 68. The body 67 is a generally V-shaped plate member having a central longitudinal valley base line 69 separating the body into equal portions. The outer end 71 of the body is straight and slopes upwardly and inwardly. The outer portions of the end 71 are joined to longitudinal parallel sides 72 and 73. The body 67 is a V-shaped member having a channeled leading face 74 and a complementary back or trailing face 76. The angle between opposing leading sides of the body is preferably 90°. The body 66 may be other shapes as arcuate semicircular, or flat.

The arm 68 comprises a pair of parallel first members 77 and 78 secured to the trailing face 74 of the body on opposite sides of the center line of the body by welds or the like. The first members 77 and 78 are elongated flat plates which extend in an inward direction from the inside edge of the body 67. Secured to the inner ends of members 77 and 78 are a pair of second members 79 and 81. The second members project in a forward direction beyond a longitudinal line passing through the center of gravity of the body. The forward ends of the second members 79 and 81 are secured together with a transverse stop block 82. Extended through approximately the midportions of the second members 79 and 81 are transversely aligned holes 83 for accommodating a pivot member used to pivotally mount the paddle on an impeller rotor.

As shown in FIGS. 13 and 17, second members 79 and 81 are angularly positioned more than 90° relative to the first members 77 and 78. Preferably, the included angle between the first members and the second members is 100°. The stop block 82 is inclined forwardly and inwardly. Preferably, the stop block 82 is located at an angle of approximately 18° to a line normally passing through the longitudinal line of the second members 79 and 81.

Referring to FIG. 18, there is shown an impeller indicated generally at 84 comprising a triangular shaped hub or rotor 86 pivotally joined to paddles 66A, 66B and 66C at each of the apexes of the triangular hub. The impeller 84 is located in the housing 87 mounted on a frame 88. The impeller and housing form part of the silo unloader having a collector conveyor, shown as augers 89 and 91, for delivering silage 92 to a bottom inlet opening 93 of the housing. On rotation of the impeller 84, the silage is carried by the paddles in an upward direction and tangentially discharged through a top exit opening 94 into a discharge chute (not shown). The impeller hub 86 is fixed to a driven shaft 96 which rotatably mounts the impeller in the housing 87. A motor (not shown) drivably connected to the shaft 96 drives the impeller 84 in the direction of the arrow 97 so that the paddles pick up the silage from the bottom opening and discharge the silage in an upward direction through the exit opening 94. The hub 86 is a flat disc like triangular member having circular bosses 98, 99 and 101 at each of the three corners of the member. Adjacent bosses are joined with a peripheral rib 102 which forms an enlarged outer edge on a flat disc 103. A cylinder 104 is carried in the center portion of the disc to mount the disc on the shaft 96. A key 106 is used to rotatably secure the cylinder 104 to the shaft 96. The entire hub may be a single cast metal member.

Arm 68 is pivotally mounted on the boss 98 by a transverse pivot member or pin 107. The pin 107 lies along a transverse axis that extends through a longitudinal line which is forward of the center of gravity of the paddle. On rotation of the impeller in the direction of the arrow 97, the paddles 66A, 66B, and 66C move in a forward direction. The centrifugal force acting on the paddle pivots the paddle about the pins 107 in a forward direction until the stop block 82 strikes the rib 102 at point F shown in FIG. 20. The forward edge 82A of the block engages the rib 102 to prevent further forward pivotal movement of the paddle 66A. In this position, the longitudinal valley line 69 is in general radial alignment with the axis of the shaft 96. This radial line is rearward of the radial line passing through the pivot pin 107.

As shown in broken lines in FIG. 20, the paddle 66A can pivot in a rearward direction until the inside end 108 of the body 67 engages the rib 102 at point R. This provides the paddle with quick rearwardly relief movement. This relief movement is desirable to account for any irregular feeding or a bunch of material, as silage or haylage, that is moved into the bottom opening 93 of the impeller housing.

Theoretically, the most efficient material moving impeller has rigid paddles that extend radially from the center of rotation of the impeller or slightly forward of the center of rotation of the impeller. The relationship between the center of gravity of the paddle and its pivot axis of the present invention maintains the paddle substantially rigid in the radial position even at relatively low rotational speeds. Thus, the impeller of the invention approaches the efficiency of a rigid paddle impeller. The forward swing position of the paddle is limited by the stop between the pivoted paddle and hub or paddle support so that very close tolerances can be maintained between the paddle and the warped sheet 37 of the impeller housing. This structure permits the use of a paddle having a relatively sharp V-shape.

When relief of the pivoted paddle is necessary, as when a chunk of frozen or hard material enters the impeller, the relief action is extremely fast. A comparison between the relief action of a pivoted paddle, as shown in U.S. Pat. No. 2,958,412 and the pivoted paddle of the present invention is shown in FIG. 7. The relief swing of the pivoted paddle 15B is shown in full line arc A. The relief swing of the old pivoted paddle follows the broken line arc B. A short arc or very few degrees of back rotation of the paddle 15B provides a substantial space between the end of the paddle and the warped sheet 37. This back relief action is fast. Once the obstruction has passed, the return forward movement of the paddle to its normal position is also fast. The relief action is against a relatively high centrifugal force so that the paddle generally does not swing all the way back thereby minimizing the shock and rapping of the paddle back against the hub. The centrifugal force acts as a shock absorber. In use, when a large chunk of material enters the impeller the first paddle will release to a point where it will shave off some of the material. Successive paddles will each reduce the size of the chunk of material until it is moved through the impeller.

The impeller of the invention provides an efficient means for moving a large amount of particulate material with relatively low power requirements. The efficiency of the impeller is predicated on the pivoted paddles having fast relief action and fast return action and a large centrifugal force to hold the paddles in a substantially rigid radial position.

The embodiments of the invention in which an exclusive property or privilege I claim are defined as follows:

1. An impeller paddle for connection to a rotor comprising: a paddle portion having a leading face and a trailing face and longitudinally spaced inner and outer ends, arm means connected to said paddle portion and extended therefrom, and said arm means having a portion thereof located substantially forward of a line passing through the center of gravity of the paddle portion, said line extending generally parallel to the longitudinal axis of the paddle portion, said portion having means adapted to facilitate pivotal connection of the arm means to the rotor substantially forward of said line.

2. The impeller paddle of claim 1 wherein the paddle portion has a leading face and the means to facilitate connection is located forward and inward of the leading face of the paddle portion.

3. The impeller paddle of claim 1 wherein the paddle portion has a substantially V-shaped cross-sectional configuration with the line of intersection of the two surfaces thereof extending longitudinally of the paddle portion and with two surfaces diverging from said line in a forward direction and wherein the means to facilitate connection is located substantially forward of said line of intersection.

4. The impeller paddle of claim 3 wherein the arm means includes a first inwardly extended portion adjacent said paddle portion and a second portion extended forwardly from said first portion, and wherein said means to facilitate connection is located in said second portion.

5. The impeller paddle of claim 4 wherein the arm means comprises two spaced, substantially parallel, substantially identical members each rigid with said paddle portion.

6. An impeller paddle for connection to a rotor comprising: a paddle portion having a leading face and a trailing face and longitudinally spaced inner and outer ends, arm means connected to said paddle portion and extended therefrom, said arm means comprising two spaced substantially parallel and substantially identical arm members, each rigid with said paddle portion, each arm member having a first inwardly extended portion adjacent said paddle portion and a second portion extended forwardly from said first portion, said second portion having means located substantially forward of a longitudinal line through the center of gravity of the paddle portion adapted to facilitate pivotal connection of the arm means to the rotor, and a stop member connected to each of said arm members and extended therebetween.

7. The impeller paddle of claim 6 wherein the stop member is in general longitudinal alignment with the paddle portion.

8. The impeller paddle of claim 6 wherein the stop member is forward of the pivot axis of the paddle.

9. An impeller comprising: a rotor rotatable about an axis, a paddle having longitudinally spaced inner and outer ends and leading and trailing faces, said paddle having arm means having a portion located substantially forward of a longitudinal line passing through the center of gravity of the paddle, means associated with the portion of the arm means pivotally connecting said paddle to said rotor at a position spaced radially from said axis and forwardly of the longitudinal line through the center of gravity of said paddle, and stop means operable between said rotor and said paddle to limit the forward pivotal movement of said paddle with respect to said rotor.

10. The impeller of claim 9 wherein said stop includes an abutment means on said arm means and cooperating abutment means on said rotor.

11. The impeller of claim 9 wherein the paddle includes a portion having a generally V-shaped cross-sectional configuration with the line of intersection between the two surfaces extended longitudinally and with the two surfaces diverging in a forward direction, and wherein the means providing the pivotal connection between the arm means and rotor is substantially forward of the line of intersection between the two surfaces of the paddle.

12. The impeller of claim 9 wherein the arm means includes two spaced, generally parallel members extended inwardly and forwardly of the V-shaped portion and said stop means includes a member connected to each of said arm members and extended therebetween.

13. The impeller of claim 12 wherein the last named member extends between said arm members substantially at the forward ends thereof, and cooperates with an abutment surface on the rotor, forward of the pivotal connection with said paddle.

14. An impeller comprising: a rotor rotatable about an axis, a paddle having longitudinally spaced inner and outer ends and leading and trailing faces, said paddle having a generally V-shaped cross sectional configuration with the line of intersection between the two faces extended longitudinally and with the two faces extended longitudinally and diverging in a forward direction, arm means comprising two spaced generally parallel arm members extended inwardly and forwardly of the V-shaped portion, means pivotally connecting the arm means to said rotor at a position spaced radially from said axis and located on said arm means forwardly of a longitudinal line through the center of gravity of said paddle, a stop member connected to each of said arm members and extended therebetween operable between said rotor and said arms to limit forward pivotal movement of said paddle with respect to said rotor, and each of the arm members include a first inwardly extended portion adjacent the V-shaped portion and a second portion extended forwardly from said first portion, the stop member extended therebetween is located substantially at the intersection of the first and second portions of said legs, and said rotor includes a rearwardly projected stop member located rearwardly of the pivotal connection between the rotor and the paddle and cooperable with the stop member on said paddle.

15. The impeller of claim 12 wherein said stop means includes means cooperating with said member of the stop means to selectively adjust the forwardmost pivotal position of said paddle.

16. The impeller of claim 9 wherein said stop means is disposed so that in the forwardmost pivotal position of said paddle the line of intersection therein lies substantially on a line through the axis of rotation of the rotor.

17. The impeller of claim 9 further including a housing substantially in the form of a scroll and substantially enclosing said impeller, the housing comprising: two generally parallel planar wall portions disposed generally normal to the axis of rotation of the rotor and a curved circumferential member extending between and connecting said planar wall portions, means defining a tangential exit opening from said housing, and means defining a side entrance opening and a circumferential entrance opening to said housing.

18. An impeller comprising: a rotor rotatable about an axis, a stop on an outer portion of the rotor, throwing means having arm means with forwardly directed portions, means pivotally mounting said portions of the arm means on said outer portions of the rotor whereby the pivot axis is substantially forward of a line through the center of gravity of the throwing means, said line extending generally parallel to the longitudinal axis of the throwing means, said throwing means having means engageable with the stop to limit forward pivoted movement thereof.

19. An impeller comprising: a rotor rotatable about an axis, a stop on an outer portion of the rotor, throwing means having arm means with forwardly directed portions, means pivotally mounting said portions of the arm means on said outer portions of the rotor whereby the pivot axis is substantially forward of a line through the center of gravity of the throwing means, said line extending generally parallel to the longitudinal axis of the throwing means, said throwing means having means engageable with the stop to limit forward pivoted movement thereof, said rotor having a hub, and circumferentially spaced members projected radially outward from the hub, each member has spaced plates and sleeve means secured to outer portions of the plates, said stop projected rearwardly from the sleeve means and throwing means pivotally connected to each sleeve means.

20. An impeller paddle for connection to a rotor comprising: a paddle portion having a leading face and a trailing face, and an inner end and an outer end longitudinally spaced from the inner end, angular shaped arm means connected to said paddle portion, said arm means having a first inwardly extended portion secured to the paddle portion and a second portion extended forwardly from said first portion, said second portion having means to facilitate pivotal connection of the arm means to a rotor substantially forward of a longitudinal line extending parallel to the longitudinal axis of the paddle portion and passing through the center of gravity of the paddle portion, and a stop member connected to the arm means to limit pivotal movement of the paddle relative to the rotor.

21. The impeller paddle of claim 20 wherein: the arm means comprise two spaced, substantially parallel, substantially identical members each rigid with the paddle portion, said stop member being connected to each of said arm members and extended therebetween.